United States Patent
Yang et al.

(10) Patent No.: US 9,878,613 B2
(45) Date of Patent: Jan. 30, 2018

(54) STRUCTURE FOR OPENING AND CLOSING FUEL DOOR

(71) Applicant: Hyundai Motor Company, Seoul (KR)

(72) Inventors: Seung-Jun Yang, Hwaseong-si (KR); Yong-Sam Lee, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/091,392

(22) Filed: Apr. 5, 2016

(65) Prior Publication Data

US 2017/0182881 A1   Jun. 29, 2017

(30) Foreign Application Priority Data

Dec. 24, 2015  (KR) .......................... 10-2015-0186533

(51) Int. Cl.
*B62D 25/00* (2006.01)
*B60K 15/05* (2006.01)

(52) U.S. Cl.
CPC ........ *B60K 15/05* (2013.01); *B60K 2015/053* (2013.01); *B60K 2015/0538* (2013.01)

(58) Field of Classification Search
CPC .... B65H 2701/33; B65H 57/12; B62D 1/184; A45C 13/26; A45C 13/262; E05B 83/34; B60K 15/05; B60K 2015/053; B60K 2015/0576; B60K 2015/0584
USPC ..................................................... 296/97.22
See application file for complete search history.

(56) References Cited

U.S. PATENT DOCUMENTS

| | | | | |
|---|---|---|---|---|
| 3,785,006 A | * | 1/1974 | Metz | E05F 1/1284 16/293 |
| 7,185,938 B2 | * | 3/2007 | Beck | B60K 15/04 292/207 |
| 8,616,609 B2 | * | 12/2013 | Ogata | B60K 15/05 296/97.22 |
| 9,616,745 B2 | * | 4/2017 | Beck | B60K 15/05 |
| 2007/0289397 A1 | * | 12/2007 | Ritter | E05F 15/622 74/22 A |
| 2014/0084620 A1 | * | 3/2014 | Frommann | B60K 15/05 296/97.22 |

(Continued)

FOREIGN PATENT DOCUMENTS

| | | |
|---|---|---|
| JP | 07-329585 A | 12/1995 |
| JP | 2009-154788 A | 7/2009 |
| JP | 2011-080301 A | 4/2011 |

(Continued)

*Primary Examiner* — Kiran B Patel
(74) *Attorney, Agent, or Firm* — Morgan, Lewis & Bockius LLP

(57) ABSTRACT

A structure for opening and closing a fuel door may include the main body e rotatably coupled to the vehicle body, and having a binding portion formed on a surface of the main body, a housing formed in a pipe shape and mounted on the vehicle body, and having a plurality of openings at a side of the housing, a pop-up rod having a fastening portion formed at an upper end of the pop-up rod and engaged with the binding portion, a first spring mounted to allow the pop-up rod to move upward toward the main body, and a locking rod which has a first end inserted into a fixing groove formed at a side of the pop-up rod when the locking rod moves forward, to restrict a sliding movement of the pop-up rod, in which the locking rod may be formed in a dual fork shape.

4 Claims, 5 Drawing Sheets

(56) References Cited

U.S. PATENT DOCUMENTS

2015/0337569 A1* 11/2015 Lim ........................ E05B 83/34
292/197

FOREIGN PATENT DOCUMENTS

| KR | 10-2005-0020303 A | 3/2005 |
|----|-------------------|--------|
| KR | 10-2006-0005118 A | 1/2006 |
| KR | 10-2013-0065108 A | 6/2013 |
| KR | 10-1567246 B1 | 11/2015 |

* cited by examiner

STRUCTURE FOR OPENING AND CLOSING FUEL DOOR

CROSS-REFERENCE TO RELATED APPLICATIONS

The present application claims priority to Korean Patent Application No. 10-2015-0186533, filed on Dec. 24, 2015, the entire contents of which is incorporated herein for all purposes by this reference.

BACKGROUND OF THE INVENTION

Field of the Invention

The present invention relates to a structure for opening and closing a fuel door, and more particularly, to a structure for opening and closing a fuel door, which is capable of preventing an operational defect during an operation of opening and closing a fuel door, and simplifying an operational structure.

Description of Related Art

In general, a cap is mounted on a fuel inlet, and a fuel door is mounted on an outer panel of a vehicle body and configured to be opened and closed manually or automatically so that the fuel inlet is exposed to the outside for refueling a vehicle.

The fuel door for a vehicle in the related art is rotatably and hingedly connected to one side of a circular housing formed in the outer panel that constitutes the vehicle body, and a catcher is provided at the other side of the housing and selectively coupled to the fuel door so as to fix the fuel door to the housing.

Here, the catcher is a device for opening and closing the fuel door. The catcher is selectively coupled to the fuel door by a rotation of the fuel door so as to maintain a closed state of the fuel door, and the catcher is connected to a cable in the interior of the vehicle so as to allow the fuel door to be unlocked and popped up by a manipulation of a driver.

However, in the case of the structure for opening and closing the fuel door in the related art, since a rod, which is connected with the cable in the interior of the vehicle and provided with an elastic member having elastic force, is frequently operated to open and close the fuel door, there is a problem in that an operation of opening and closing the fuel door cannot be smoothly carried out, and as a result, durability and marketability deteriorate.

Because of a continuous load of elastic force, a panel formed at a rear side of the door is pushed by the elastic force, which causes deformation of a pop-up rod coupled to the panel as well as deformation of a shape of the panel, and as a result, there is a problem in that an operational defect and an external appearance defect occur.

Because of the deformation of the panel, there is a problem in that the fuel door having the panel is also deformed, which causes deterioration in aesthetic external appearance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for opening and closing a fuel door, which is capable of solving the problem of an operational defect and an external appearance defect when the fuel door is opened, by integrating a pop-up rod with a main body and simultaneously controlling both the main body and the pop-up rod by a dual type locking rod.

An exemplary embodiment of the present invention provides a structure for opening and closing a fuel door, in which one end of a main body is rotatably mounted on a vehicle body such that a rotation of the main body is restricted when the fuel door is locked, and the rotation of the main body is permitted when the fuel door is opened, the structure including: the main body which is rotatably coupled to the vehicle body, and has a binding portion formed on a surface of the main body, a housing which is formed in a pipe shape and mounted on the vehicle body, and has a plurality of openings at one side of the housing, a pop-up rod which has a fastening portion that is formed at an upper end of the pop-up rod and engaged with the binding portion, a first spring which is mounted to allow the pop-up rod to move upward toward the main body, and a locking rod which has one end that is inserted into a fixing groove formed at one side of the pop-up rod when the locking rod moves forward, so as to restrict a sliding movement of the pop-up rod, in which the locking rod is formed in a dual fork shape.

The locking rod may include: a first locking rod which is inserted into the fixing groove of the pop-up rod, and a second locking rod which is formed integrally or monolithically with the first locking rod and comes into direct contact with one side of the main body.

The first locking rod may be formed to restrict a position of the pop-up rod, and the second locking rod may be formed to come into direct contact with the one side of the main body so as to restrict a position of the main body.

The locking rod may include a second spring, and the second spring may be coupled to one side of the locking rod and connected with the vehicle body, such that when a cable coupled to the other side of the locking rod is pulled, the locking rod may slide while overcoming elastic force of the second spring.

The pop-up rod may move upward and downward along a shape of a rail hole formed in the housing, and when the locking rod is retracted and the pop-up rod moves upward, the fastening portion may be disengaged from the binding portion, and when the pop-up rod moves downward, the fastening portion may be engaged with the binding portion.

An inclined surface may be formed at an end of the locking rod so that when the pop-up rod further moves downward, the locking rod may slide in a direction in which the locking rod is retracted.

According to the structure for opening and closing the fuel door according to an exemplary embodiment of the present invention as described above, it is possible to integrate the pop-up rod with the main body, and simultaneously control both the main body and the pop-up rod by the dual type locking rod, thereby preventing deformation or an external appearance defect of the fuel door when the fuel door is opened. The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

Figure 5:
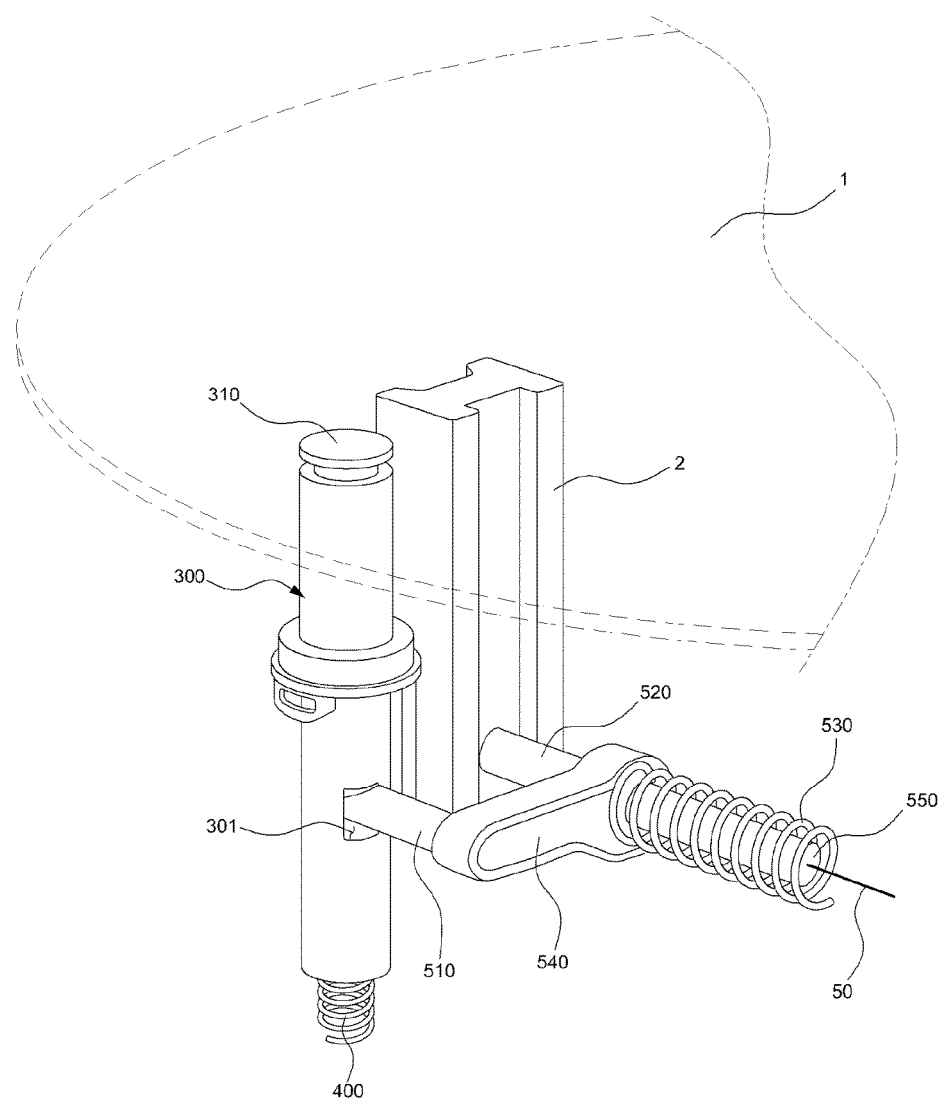

FIG. 5 is a view illustrating a structure for opening and closing a fuel door mounted on a main body.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the Field of the Invention to which the present invention pertains may easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification.

In addition, terms or words used in the specification and the claims should not be interpreted as being limited to a general and dictionary meaning and should be interpreted as a meaning and a concept which conform to the technical spirit of the present invention based on a principle that an inventor can appropriately define a concept of a term in order to describe his/her own invention by the best method.

Hereinafter, the exemplary embodiment of the present invention will be described in detail with reference to the accompanying drawings.

Figure 1:
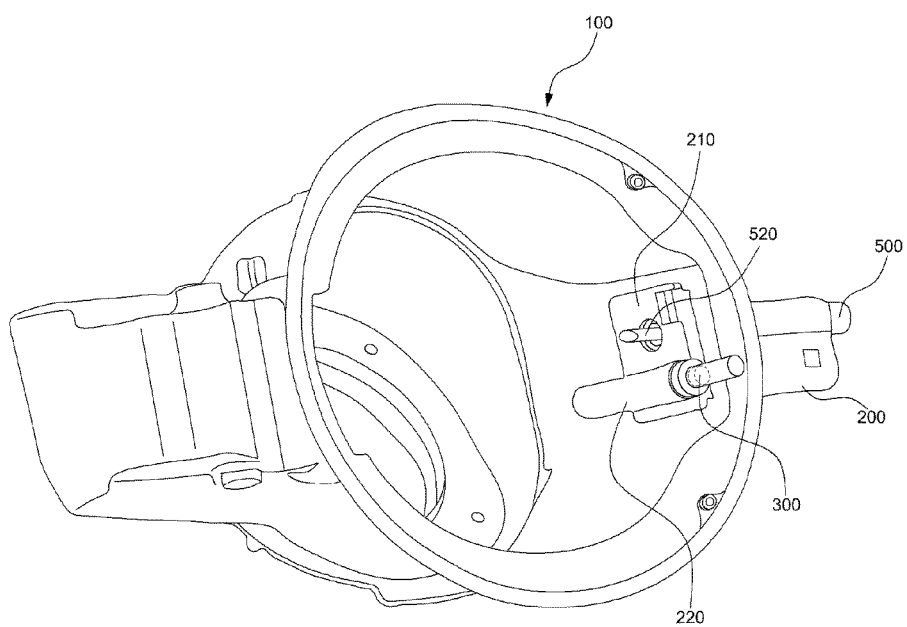
FIG. 1 is a view illustrating a structure for opening and closing a fuel door according to an exemplary embodiment of the present invention.
Figure 2:
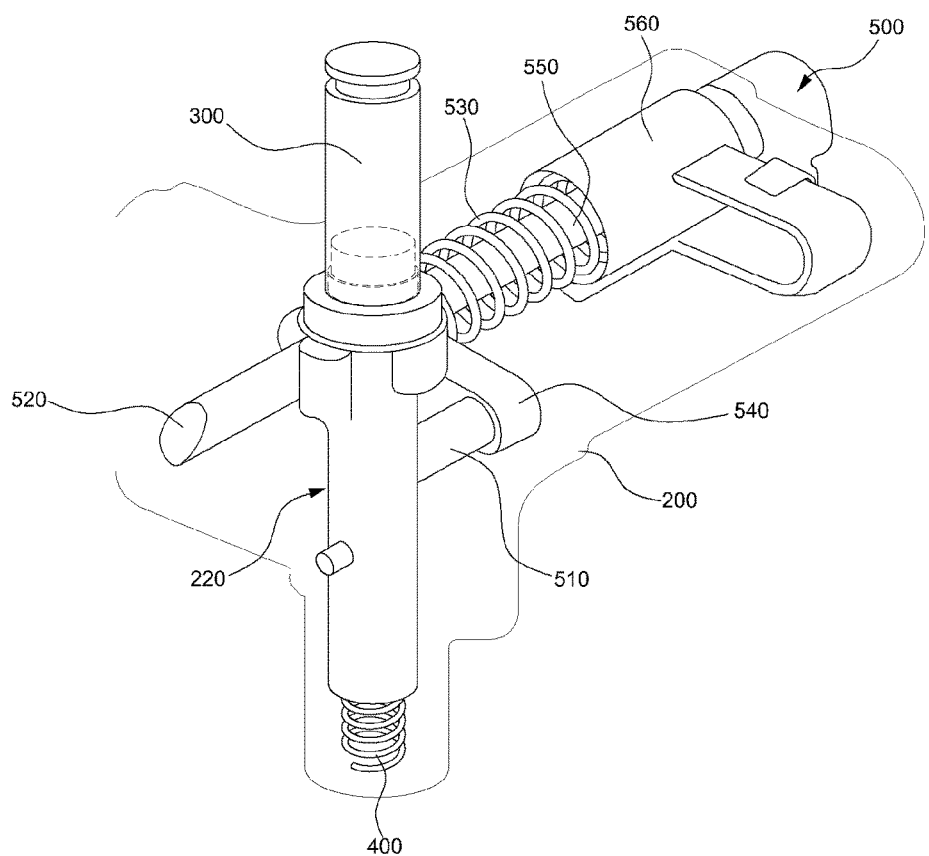
FIG. 2 is a view illustrating a state in which a locking rod is mounted on a pop-up rod in the structure for opening and closing the fuel door which is illustrated in FIG. 1.
Figure 3:
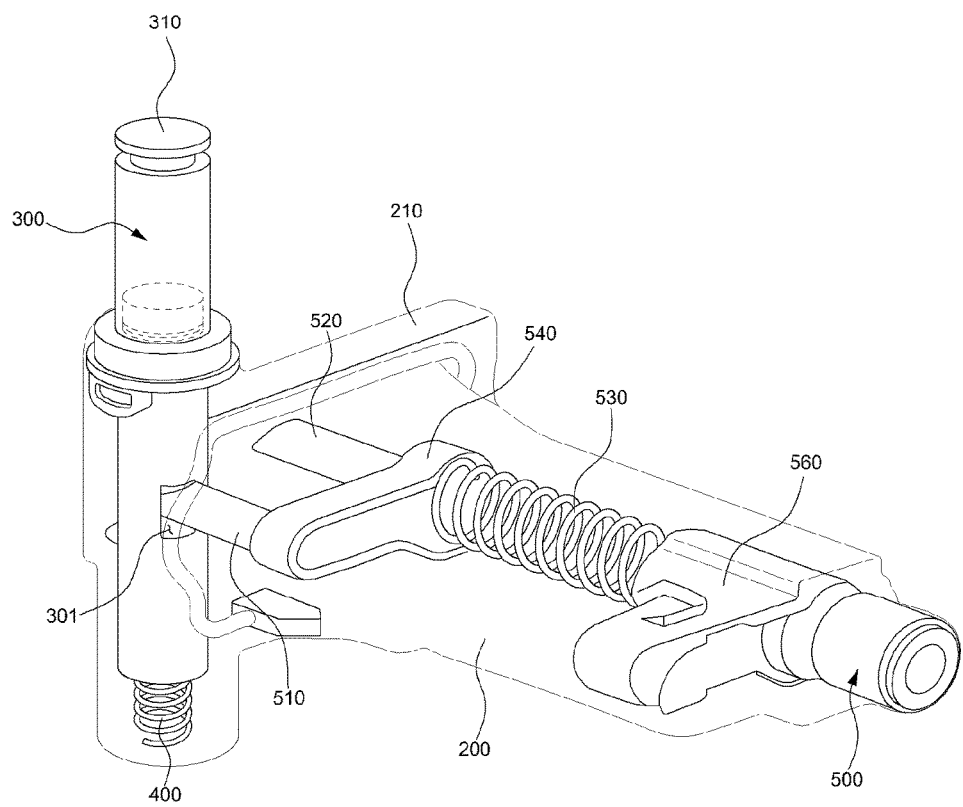
FIG. 3 is a view illustrating a state in which a fastening portion of the pop-up rod is coupled to a binding portion of a main body in the structure for opening and closing the fuel door which is illustrated in FIG. 1.
Figure 4:
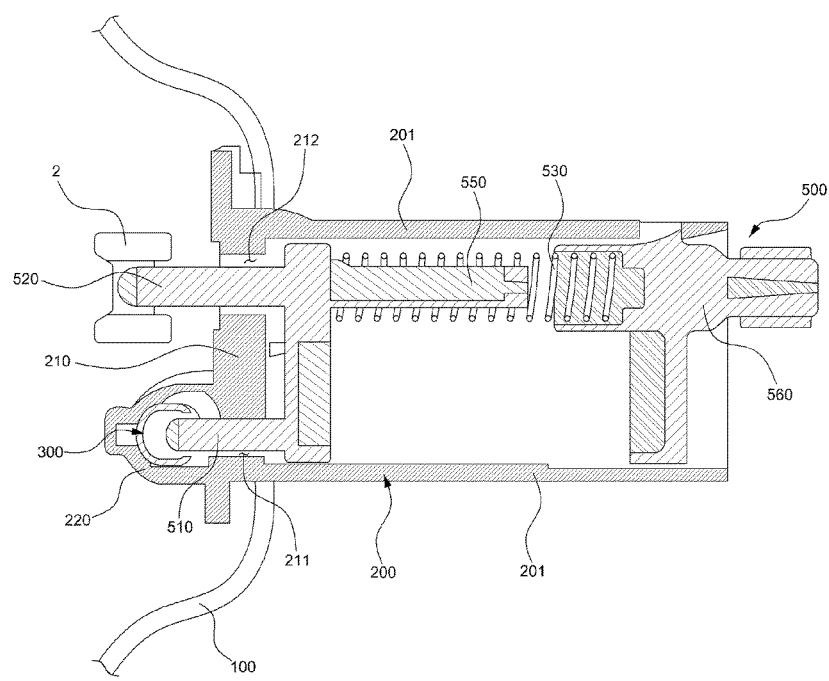
FIG. 4 is a view illustrating an inner part of the structure for opening and closing the fuel door which is illustrated in FIG. 3.

FIG. 1 is a view illustrating a structure for opening and closing a fuel door 1 according to the exemplary embodiment of the present invention, FIG. 2 is a view illustrating a state in which a locking rod is mounted on a pop-up rod in the structure for opening and closing the fuel door which is illustrated in FIG. 1, FIG. 3 is a view illustrating a state in which a fastening portion of the pop-up rod is coupled to a binding portion of a main body in the structure for opening and closing the fuel door which is illustrated in FIG. 1, FIG. 4 is a view illustrating an inner part of the structure for opening and closing the fuel door which is illustrated in FIG. 3, and FIG. 5 is a view illustrating a structure for opening and closing a fuel door mounted on a main body.

Referring to FIGS. 1 to 4, a structure for opening and closing a fuel door according to an exemplary embodiment of the present invention is configured to prevent an operational defect during an operation of opening and closing the fuel door, and simplify an operational structure. In addition, in the structure for opening and closing the fuel door, one end of the main body 100 is rotatably mounted on a vehicle body, such that the rotation of the main body 100 is restricted when the fuel door is locked, and the rotation of the main body 100 is permitted when the fuel door is opened. Further, the structure for opening and closing the fuel door includes the main body 100, a housing 200, a pop-up rod 300, a first spring 400, and a locking rod 500.

Here, the main body 100 on which the fuel door 1 is installed, as shown in FIG. 4, is rotatably coupled to the vehicle body, and a binding portion is formed on a surface of the main body 100.

The housing 200 mounteed on one side of the main body 100 as shown in FIG. 4 is formed in a pipe shape and mounted on the vehicle body. The housing 200 may have a front panel 210 closing an end of the housing body 201 and including a pipe-shaped cylinder 220 Further, a plurality of openings including a first hole 211 and a second hole 212 is formed at the front panel 210 of the housing body 201 of the housing 200.

A cap 310, which may be engaged with the binding portion, is formed at an upper end of the pop-up rod 300. In addition, the pop-up rod 300 moves upward and downward along a shape of a rail hole formed in the housing 200, and when the locking rod 500 to be described below is retracted and the pop-up rod 300 moves upward, the cap 310 may be disengaged from the binding portion, and when the pop-up rod 300 moves downward, the cap 310 may be engaged with the binding portion.

The first spring 400 is mounted to allow the pop-up rod 300 to move upward toward the main body 100.

The locking rod 500 is formed in a dual fork shape, and when the locking rod 500 moves forward, one end of the locking rod 500 is inserted into a fixing groove 301 formed at a rod body 302 of the pop-up rod 300 so as to restrict a sliding movement of the pop-up rod 300. To this end, the locking rod 500 may include a first locking rod 510 and a second locking rod 520. Here, one end of the first locking rod 510 may be inserted into the fixing groove 301 of the pop-up rod 300 and the other end of the first locking rod 510 is fixed to a connecting bar 540 vertically. In addition, the first locking rod 510 may be formed to restrict a position of the pop-up rod 300. Further, one end of the second locking rod 520 is configured to contact with the an arm 2 of the fuel door 1 and the other end thereof may be formed integrally or monolitcally with the first locking rod 510 so as to come into direct contact with one side of the main body 100. In addition, the second locking rod 520 may be formed to come into direct contact with one side of the main body 100 so as to restrict the position of the main body 100. Further, the locking rod 500 has a shaft 550 coupled to a rear end of the connecting bar 540 and may include a second spring 530 provided on an outer circumferentuial surface thereof to provide an elastic force to the connecting bar 540, and a rear panel 560 may be coupled to the shaft 550 and is configured for closing the other end of the housing 200, and the second spring 530 is coupled to one side of the locking rod 500, such that when a cable 50 coupled to the rear plate 560 of the locking rod 500 for pulling the shaft 550 is pulled to open the fuel door 1, the shaft 550 is is pulled backward, the locking rod 500 may slide while overcoming elastic force of the second spring 530, the first locking rod 510 is separated from the fixing groove 301 of the pop-up rod 300 and the second locking rod 420 is detached from the arm 2. When the cable 50 is returned to close the fuel door 1, the shaft 550 is returned frontward by the elastic force of the second spring 530 and the first locking rod 510 is entered into the fixing groove 301 of the pop-up rod 300, and the second locking rod 520 is in contact with the arm 2.

Meanwhile, an inclined surface may be formed at an end of the locking rod 500 so that when the pop-up rod further moves downward, the locking rod 500 may slide in a direction in which the locking rod 500 is retracted. For this reason, even though the locking rod 500 is forced to be strongly inserted into the fixing groove 301, it is possible to prevent the pop-up rod 300 from being subjected to impact, and prevent a portion of the inclined surface of the locking rod 500 from being damaged.

According to the structure for opening and closing the fuel door according to an exemplary embodiment of the present invention as described above, it is possible to integrate the pop-up rod 300 with the main body 100, and simultaneously control both the main body 100 and the pop-up rod 300 by the dual type locking rod, thereby preventing deformation or an external appearance defect of the fuel door when the fuel door is opened.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for opening and closing a fuel door, the structure including:
    a housing mounted on one side of a main body on which the fuel door is installed;
    a pop-up rod provided with a cap to be in contact with the fuel door at an upper side thereof, a fixing groove formed at a rod body of the pop-up rod, and a first spring at a lower side of the pop-up rod;
    a locking rod having:
        a first locking rod, wherein a first end of the first locking rod selectively enters the fixing groove of the pop-up rod, and a second end thereof is fixed to a connecting bar vertically; and
        a second locking rod, wherein a first end of the second locking rod selectively contacts with an arm of the fuel door and a second end thereof is fixed to the connecting bar.

2. The structure for opening and closing the fuel door of claim 1,
    wherein the housing includes a housing body and has a front panel closing a first end of the housing body and
    wherein a first hole, a second hole and a pipe-shaped cylinder are formed on the front panel.

3. The structure for opening and closing the fuel door of claim 2,
    wherein the locking rod includes:
        a shaft coupled to a rear end of the connecting bar;
        a second spring provided on an outer circumferential surface of the shaft to provide an elastic force to the connecting bar; and
        a rear panel coupled to the shaft and closing the second end of the housing, and wherein a cable pulling the shaft is connected the rear panel.

4. The structure for opening and closing the fuel door of claim 3,
    when the cable is pulled to open the fuel door, the shaft is pulled backward and the first locking rod is separated from the fixing groove of the pop-up rod, and then the second locking rod is detached from the arm; and
    when the cable is returned to close the fuel door, the shaft is returned frontward by the elastic force of the second spring and the first end of the first locking rod is entered into the fixing groove of the pop-up rod, and the second locking rod is in contact with the arm.

* * * * *